Jan. 14, 1930.  H. WYDLER  1,743,745
LIQUID MEASURING DEVICE WITH TWO ALTERNATELY
FILLED AND DISCHARGED GAUGED VESSELS
Filed Aug. 4, 1925  2 Sheets-Sheet 1

Inventor
H. Wydler
By
Atty

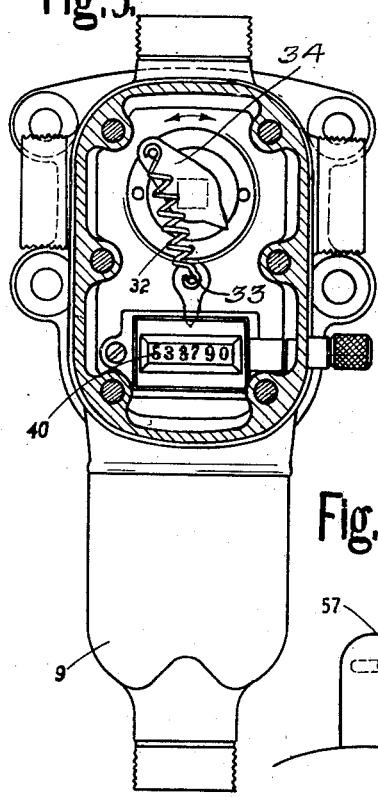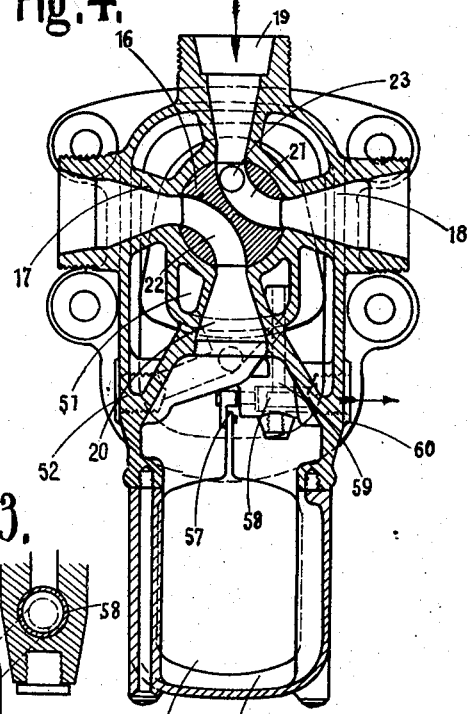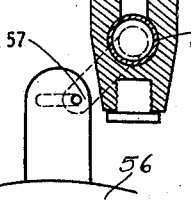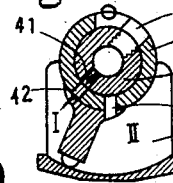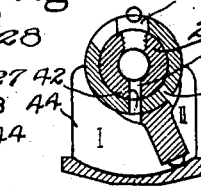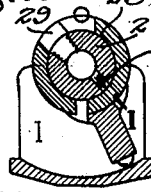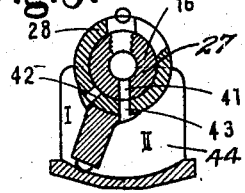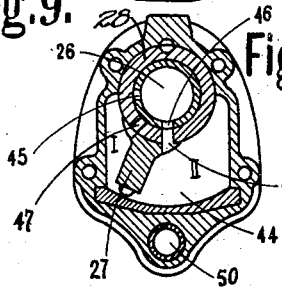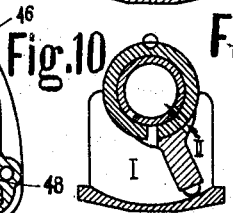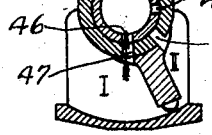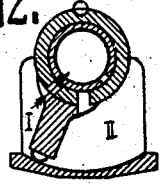

Patented Jan. 14, 1930

1,743,745

UNITED STATES PATENT OFFICE

HERMANN WYDLER, OF BERN, SWITZERLAND, ASSIGNOR TO SAUSER S. A., OF SOLEURE, SWITZERLAND

LIQUID-MEASURING DEVICE WITH TWO ALTERNATELY FILLED AND DISCHARGED GAUGED VESSELS

Application filed August 4, 1925, Serial No. 48,148, and in Switzerland August 6, 1924.

Liquid-measuring apparatus with two alternately filled and discharged gauged vessels have been known already, where the pressure of the supplied liquid which is to be measured moves a member which acts simultaneously as a controlling and reversing member causing the alternate connection of each vessel with the admission and discharge conduit. In such apparatus there is mostly employed a piston which like a slide is provided with various grooves and openings.

The object of the present invention is an apparatus of this kind in which however the reversing member, which is moved after the complete filling of one of the gauged vessels, is the plug of a four-way cock upon which is sleeved a wing moved directly by the pressure of the supplied liquid.

In the annexed drawing a working example of the invention adapted to a benzine supplying station is shown wherein:

Fig. 3 is a section taken at right angles to Fig. 1.

Fig. 4 is a cross section on line IV—IV of Fig. 2.

Figs. 5 to 12 are cross-sections showing the different positions of a wing as the moving member, in Figs. 5 to 8 for an interior chamber and Figs. 9 to 12 for an exterior chamber of the plug.

Fig. 13 is a detail of the vent valve operating device.

Figure 1:
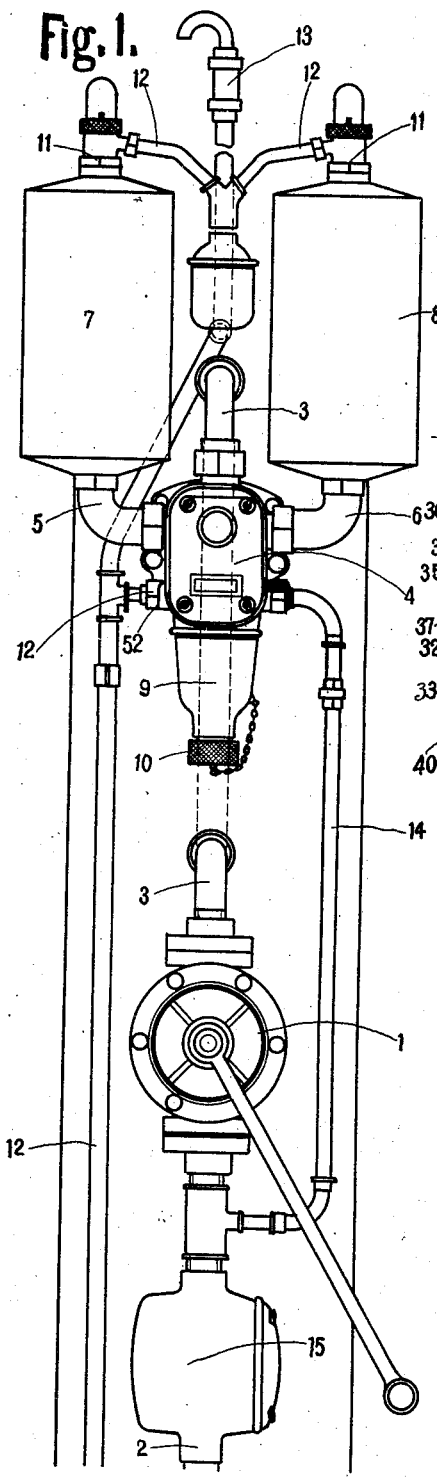
Fig. 1 is a front view of the general arrangement of the whole apparatus.

According to Fig. 1 a hand pump is connected at one end to a suction pipe 2 leading to a supply tank of benzine not shown, and at the other end to the admission conduit 3 of a reversing device 4 where elbows 5 and 6 are alternately serving as inlet passage-ways into the gauged vessels 7 and 8 and as outlet passageways into the discharge neck.

This discharge neck 9 of the reversing device if not in use is closed by a screw cap 10. 11 are venting devices for instance capillary tubes which are blocked up when getting into contact with the rising liquid and 12 are conduits serving for the venting as well as for the overflow into a receptacle, not shown, of any liquid which would casually leak through the venting devices. Pipe 13 serves for venting alone while 14 is for venting the suction conduit of the pump and 15 is a filter for freeing the benzine from any solid admixtures.

The reversing device according to Figs. 2 to 13 is in fact a four-way cock possessing two passage-ways 21 and 22 and operated by a wing 27. The plug 16 of this cock is controlled by the pressure of the raised liquid in such a way that it turns at an angle of 90° from the position in Fig. 4 in a counter-clockwise sense and back again alternately and simultaneously establishing communication between the two conduits 17 and 18 leading to the vessels 7 and 8 and between the admission and delivery conduits 19 and 20.

The canal 21 of the four-way cock communicates by a branch canal 23 with an interior chamber 24 of the plug which is separated by a plate 25 from an exterior chamber 26 at the end portion of the plug. A slotted sleeve 28 rigidly fast to a wing 27 is fitted rotatably to the end part of the plug and is operated by the wing so as to execute alternate clockwise and counter-clockwise oscillations which are transmitted by means of a trailing coupling to the plug. This trailing coupling comprises a carrier pin 29 which being fast on the plug moves in a slot of the sleeve 28 so as to allow a dead movement of 45° between plug and sleeve. The movement of the sleeve 28 and of the wing is however limited to 45° by a ball 30 resiliently lodged within the box of the plug and extending, for half of its thickness into a furrow 31 provided within the sleeve and having a length of 45°, so that in the extreme positions of the sleeve this sleeve is prevented from turning with the plug. But aside from the sleeve the movement of the plug also depends on a helical spring 32 which is intended to give to said plug an additional turn at the end of its movement performed jointly with the sleeve. One end of spring 32 is attached to a stay pin 33 while its other end is fast to one arm of a lever 34 which is integral with a shank key 35 inserted into the plug 21, 22. In order to prevent any wedging effect on the plug said key is loosely inserted with a squared part into a nipple 36 screwed into the plug and the head of said nipple is clutched by another nipple 38 which carrying a ball bearing 37 for the neck of the key is secured to the plug by an intermediate nipple 39, and serves for regulating the plug 21, 22. The other arm of lever 34 is arranged so as to strike against a small lever mounted loose on the stay-pin 33 and adapted to move the counter 40.

The working of the wing 27 is effected by a branch current of the liquid supplied by the pump wherefor provision is made for a port hole 41 in the cylindrical wall of the chamber 24 and for port holes 42, 43 within the sleeve said latter holes registering with port 41 in the extreme positions of the wing.

Chamber 24 admits liquid alternately on both sides of the wing, while chamber 26 facilitates the escape of the liquid displaced by the wing when traversing the chamber 44. For this purpose there are port-holes 45, 46 in the chamber 26 registering with portholes 47, 48 of sleeve 28.

A cavity 49 and a canal 50 allows the liquid to pass from chamber 26 into the hollow space 51 from where the liquid returns through a neck 52 and through the pipe 12 into the supply tank. Into the same hollow space 51 is drained also any liquid leaking through casual untightness of the plug said liquid being collected by an annular groove 53.

The delivery outlet 20 is fitted with a filter 54. Besides there is in the plug box in a widened part of the discharge neck 9 a float chamber 55 with a float 56 which by means of a lever gear 57 is in connection with a sleeve-valve 58 of an air release valve 59 communicating through canal 60 and the pipe 14 with the suction conduit 3. If everything works regularly this space 55 remains empty and the float acts simply like a weight on the closed valve. If however the pump works too fast or if the discharge is partly blocked the rising liquid in chamber 55 will cause the air release valve to open and to render the pumping noneffective by admitting air into the suction pipe.

Figure 2:
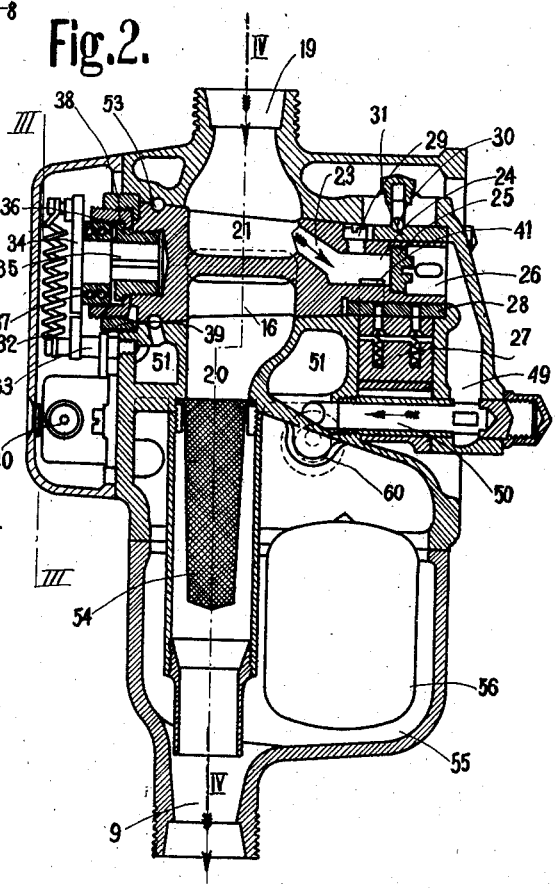
Fig. 2 is a longitudinal section of the device for alternately establishing the communication between two measuring vessels taken at right angles to Fig. 1.

The working of this reversing device is as follows:

In the initial position shown in Figs. 2 to 4 and when the pump 1 is working vessel 8 will be filled through the canal 21 of the plug and through the elbow 6 while vessel 7 will be emptied through the canal 22 of the plug. Although the liquid is also filling the chamber 24 through canal 23 and compartment I of chamber 44 through ports 41, 42 there is not yet pressure enough for moving wing 27 as long as vessel 8 is not filled up.

But as soon as this vessel is filled the pressure of the pump will at once work the wing 27 and push it from the position in Fig. 5 into that of Fig. 6 and the plug will be brought by the spring 32 into the position of Fig. 7. In Fig. 6 the sleeve by a movement of 45° has turned the plug by means of carrier 28 for 45° without changing the relative position of the ports 41, 42, 43 that the arm 34 of the key 35 attached to spring 32 has reached its middle position which is sufficient for causing the spring which is oscillating somewhat beyond said middle position to give to the plug an additional turn of 45° so that it tilts over into its end position as shown in Fig. 7. Sleeve 28 however, can only follow half the way because it is retained by ball 30. But in this position of Fig. 7 the admission port to compartment I of chamber 44 is covered while the admission to compartment II of said chamber is free so that through the now completed turn of 90° of the plug the discharge of vessel 8 and the admission of liquid into vessel 7 is commenced. As soon as this vessel is filled up the liquid pressure on the wing becomes again effective and the described operations will be repeated. Fig. 8 shows the position of parts immediately before spring 32 has turned the plug into the position of Fig. 5.

Figures 9 to 12 are showing the different positions for the discharge of the liquid from the compartments I and II into the chamber 26 and corresponding to the Figs. 5 to 8. Owing to the chosen arrangement of parts the outlet on both sides of the wing is open only when the inlet into the respective compartment is closed and inversely.

In this reversing device it is the flap 27 as a part of the plug which is acting as the reversing controlling member directly operated by the pressure of the supplied liquid, while in certain known apparatus a servomotor has been needed for this purpose.

The float 56 serves only as a safety device against any tampering with the apparatus, which might be done by too rapidly pumping or by throttling the stop cock which usually is provided on the hose attached to the outlet neck. The arrangement of parts is also so chosen that all parts allowing fraudulous tampering are easily sealed with lead.

What I claim as new and desire to secure by Letters Patent is:

1. In a liquid measuring device and in combination, two gauged vessels, a pump and a suction conduit of said pump, a distributing and reversing device inserted between said gauged vessels and the pump and comprising a box of a four way cock, four conduits communicating with said box, one conduit for the admission from the pump, one for the delivery and two for filling and discharging the gauged vessels, a plug fitted to said box and two canals provided in the plug and capable of registering with said four conduits, the first for connecting the vessels with the admission conduit and the second for connecting the vessels with the delivery conduit, pipe connections between the vessels and the conduits, a cylindrical lengthened portion of said plug enclosing an inner chamber and an outer chamber, a branch canal leading from the inner chamber to the first of the canals in the plug, and a drain conduit in open communication with the said outer chamber, a sleeve fitted rotatably to the plug and extended over the portion of the plug containing said chambers, and a wing fast to the sleeve and fitted movably into a chamber contiguous to the box of the plug so as to divide it into two compartments, ports in the sleeve and plug adapted to register with each other including a port in the inner chamber of the plug capable of registering with parts in the sleeve for connecting one of said compartments with the inner chamber of the plug, and ports in the outer chamber of the plug capable of registering with ports in the sleeve for connecting the other of said compartments with the outer chamber of the plug and a carrier pin projecting from the plug into a limited slot of the sleeve, as means for moving the plug by means of the sleeve in order to prepare the reversing movement of the plug.

2. In a liquid measuring device and in combination, two gauged vessels, a pump and a suction conduit of said pump, a distributing and reversing device inserted between said gauged vessels and the pump and comprising a box of a four way cock, four conduits communicating with said box, one conduit for the admission from the pump, one for the delivery and two for filling and discharging the gauged vessels, a plug fitted to said box and two canals provided in the plug and capable of registering with said four conduits, the first for connecting the vessels with the admission conduit and the second for connecting the vessels with the delivery conduit, pipe connections between the vessels and the conduits, a cylindrical lengthened portion of said plug enclosing an inner chamber and an outer chamber, a branch canal leading from the inner chamber to the first of the canals in the plug, and a drain conduit in open communication with the said outer chamber, a sleeve fitted rotatably to the plug and extended over the portion of the plug containing said chambers and a wing fast to the sleeve and fitted movably into a chamber contiguous to the box of the plug so as to divide it into two compartments, ports in the sleeve and plug adapted to register with each other including a port in the inner chamber of the plug capable of registering with parts in the sleeve for connecting one of said compartments with the inner chamber of the plug, and parts in the outer chamber of the plug capable of registering with ports in the sleeve for connecting the other of said compartments with the outer chamber of the plug and a carrier pin projecting from the plug into a limited slot of the sleeve, as means for moving the plug by means of the sleeve in order to prepare the reversing movement of the plug, and a tilting or reversing device for the plug, comprising a lever having a hub like a square shank engaged in a squared hollow at the head end of the plug and a tension spring attached at one end to one arm of said lever and at the other end to the casing, the whole adapted to complete the reversing movement of the plug prepared by the carrier pin.

In testimony whereof I affix my signature.

HERMANN WYDLER.